Sept. 18, 1928.

S. LEVY, JR 1,684,999

MEDICINE ADMINISTERING DEVICE

Filed Nov. 27, 1926

S. Levy Jr.
INVENTOR

BY Victor J. Evans
ATTORNEY

WITNESS

Patented Sept. 18, 1928.

1,684,999

UNITED STATES PATENT OFFICE.

SYDNEY LEVY, JR., OF SUVA, FIJI ISLANDS.

MEDICINE ADMINISTERING DEVICE.

Application filed November 27, 1926. Serial No. 151,186.

This invention relates to a medical appliance, the general object of the invention being to provide means for applying powder to a cavity of the body, such as the throat.

Another object of the invention is to provide a cylinder and a piston, the piston having an annular groove adjacent one end thereof which forms a powder receiving chamber with a removable hopper fitting over the end of the cylinder and adapted to receive a quantity of powder which is drawn into the chamber when the piston is retracted, after which the hopper is removed and then by projecting the cylinder, after the device is placed in the cavity to be treated, the powder is ejected against the walls of the cavity.

Another object of the invention is to provide an annular groove at the other end of the cylinder which is of less dimensions than the first groove so that by reversing the piston, a powder receiving chamber of less dimensions will be provided for administering a small quantity of powder.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3:
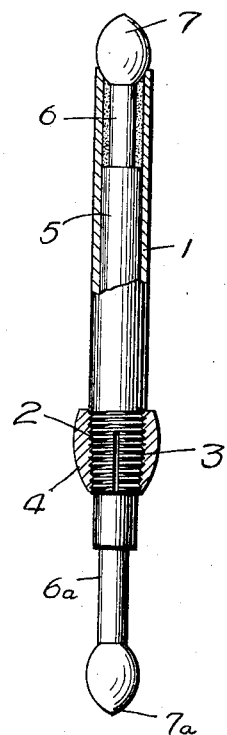
Figure 3 is an elevation with parts in section, showing the hopper removed and the chamber filled with powder.
Figure 4:
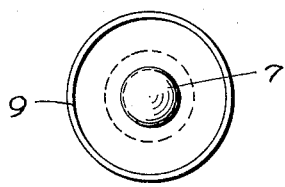
Figure 4 is a top plan view of Figure 1.

In these drawings, the numeral 1 indicates a tube or cylinder, preferably formed of hard rubber, and one end of which is tapered and threaded and divided into a number of jaws 2 by means of the slots 3. A screw cap 4 fits over the threaded part and acts to contract the jaws when screwed inwardly. Within the tube 1 is slidably arranged a piston 5. This piston is formed with the reduced portions 6 and 6ª adjacent its ends, an enlarged portion 7, preferably of prolate form, is connected with the reduced part 6, while a similar portion 7ª is detachably connected with the part 6ª so that the piston can be assembled in the cylinder. This portion 7ª acts as a handle for moving the piston in the cylinder. The upper end of the cylinder is tapered to receive a part of the portion 7, as shown in Figure 3, when the piston is in retracted position, and by providing the cap 4 and threaded jaws 2, the lower end of the cylinder can be made to fit snugly a part of the piston and by tightening the nut on the jaws, the piston can be locked against movement in the cylinder. A removable hopper 9 fits the upper end of the tube or cylinder.

Figure 1:
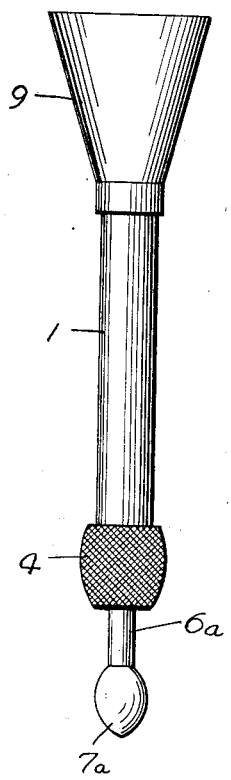
Figure 1 is an elevation of the invention with the hopper thereon.
Figure 2:
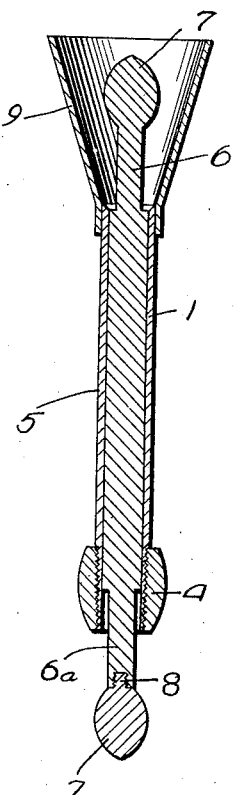
Figure 2 is a longitudinal sectional view through Figure 1.

When the device is to be used, the powder to be administered is placed in the hopper after the piston has been projected, as shown in Figure 2. Then the piston is retracted to the position shown in Figure 3, and as the piston is moving inwardly, the powder in the hopper, will be drawn into the chamber formed by the reduced part 6 and the walls of the cylinder. After the piston has been fully retracted, the hopper is removed and the nut 4 turned to lock the parts in the position they occupy in Figure 3. The device is then placed in the mouth or other cavity to receive the powder and then the nut is loosened and the piston projected by means of the handle 7ª which will eject the powder against the walls of the cavity. If desired, the part 7 can be used to place some of the powder on certain parts of the walls of the cavity.

The smaller applicator 7ª may be used by attaching and reversing the piston and reattaching its smaller diameter varies the quantity of powder and the distribution thereof.

Thus it will be seen that I have provided simple and effective means for ejecting powder and the like into the throat or other cavities.

What I claim is:—

1. A medical appliance of the class described, comprising a tube, a piston slidably arranged therein and having a reduced part adjacent one end which forms a chamber with the walls of the tube when the piston is in retracted position, and a hopper detachably connected with the tube for enabling material to be drawn into said chamber when the piston is retracted after being projected.

2. A medical appliance of the class described, comprising a tube, a piston slidably arranged therein and having a reduced part adjacent each end forming a chamber with the walls of the tube when the piston is in retracted position, a hopper detachably connected with the tube for enabling material to be drawn into said chamber when the piston is retracted after being projected, the extreme end of the piston having a rounded enlargement thereon for bringing the powder into actual contact with the mucous membrane of the cavity, the ends of the piston being of different dimensions.

3. A medical appliance comprising a tube, a piston slidably arranged therein and having its ends reduced, an enlargement at each extremity of the piston and forming with the reduced parts and the walls of the tube annular spaces or chambers when the enlargement is in engagement with the end of the tube, a detachable hopper for engaging one end of the tube and one of said enlargements being removable to permit the piston to be placed in the tube.

4. A medical appliance for administering dry powder to the cavity of the body, comprising a tube having a piston slidably mounted therein, said piston having a reduced portion adjacent one end, which forms with the walls of the tube an annular chamber when the piston is retracted, the opposite end of the tube being split and a threaded cap on the split end for enabling this end to be pressed against the piston.

5. A medical appliance for administering dry powder to the cavity of the body, comprising a tube having a piston slidably mounted therein, said piston having a reduced portion adjacent one end, which forms with the walls of the tube an annular chamber when the piston is retracted, the opposite end of the tube being split and a threaded cap on the split end for enabling this end to be pressed against the piston, said tube being slightly tapered with the split portion at the small end thereof.

In testimony whereof I affix my signature.

SYDNEY LEVY, Jr.